US012756887B2

(12) United States Patent
Hu

(10) Patent No.: US 12,756,887 B2
(45) Date of Patent: Oct. 6, 2026

(54) MULTI-STREAMER LIVE STREAMING METHOD AND APPARATUS

(71) Applicant: SHANGHAI BILIBILI TECHNOLOGY CO., LTD., Shanghai (CN)

(72) Inventor: Renzhao Hu, Shanghai (CN)

(73) Assignee: SHANGHAI BILIBILI TECHNOLOGY CO., LTD., Shanghai (CN)

( * ) Notice: Subject to any disclaimer, the term of this patent is extended or adjusted under 35 U.S.C. 154(b) by 136 days.

(21) Appl. No.: 18/527,110

(22) Filed: Dec. 1, 2023

(65) Prior Publication Data

US 2024/0187680 A1 Jun. 6, 2024

(30) Foreign Application Priority Data

Dec. 2, 2022 (CN) ......................... 202211537681.6

(51) Int. Cl.
*H04N 21/431* (2011.01)
*H04N 21/2187* (2011.01)
*H04N 21/81* (2011.01)

(52) U.S. Cl.
CPC ..... *H04N 21/4312* (2013.01); *H04N 21/2187* (2013.01); *H04N 21/816* (2013.01)

(58) Field of Classification Search
CPC ........... H04N 21/4312; H04N 21/2187; H04N 21/816
See application file for complete search history.

(56) References Cited

U.S. PATENT DOCUMENTS 10,762,878 B1 * 9/2020 Gomez Diaz .......... G09G 5/003
2012/0306855 A1 * 12/2012 Aoyama ............ A63F 13/5252 345/419
2015/0222239 A1 * 8/2015 Zhang .................... A63F 13/10 381/61

(Continued)

FOREIGN PATENT DOCUMENTS

CN 111526412 A 8/2020
CN 113038287 A 6/2021

(Continued)

*Primary Examiner* — Randy A Flynn
(74) *Attorney, Agent, or Firm* — BakerHostetler

(57) ABSTRACT

The present application provides techniques for implementing multi-streamer live streaming. The techniques comprise receiving virtual space information; determining target virtual character attribute information indicating attributes of a target virtual character corresponding to a target streamer, wherein the target streamer is associated with a streamer client device; determining target live streaming view information corresponding to the streamer client device; acquiring reference virtual character attribute information indicating attributes of a reference virtual character corresponding to a reference streamer in response to determining that the virtual space information comprises the information indicative of the reference streamer; and generating and displaying a multi-streamer live streaming image on the streamer client device by performing rendering based on the target live streaming view information, the target virtual character attribute information, the reference virtual character attribute information, and the virtual space information.

20 Claims, 5 Drawing Sheets

(56) References Cited

U.S. PATENT DOCUMENTS

| | | | | |
|---|---|---|---|---|
| 2018/0095542 | A1* | 4/2018 | Mallinson | A63F 13/213 |
| 2019/0344185 | A1* | 11/2019 | Fargo | A63F 13/35 |
| 2019/0385371 | A1* | 12/2019 | Joyce | G06F 3/011 |
| 2021/0321061 | A1* | 10/2021 | Kawakami | H04N 21/8146 |
| 2021/0370186 | A1* | 12/2021 | Ye | A63F 13/525 |
| 2022/0193542 | A1* | 6/2022 | Cotter | A63F 13/86 |

FOREIGN PATENT DOCUMENTS

| | | | |
|---|---|---|---|
| CN | 113824975 | A | 12/2021 |
| CN | 113965812 | A | 1/2022 |
| CN | 115314727 | A | 11/2022 |
| WO | WO 2022/213727 | A1 | 10/2022 |

* cited by examiner

MULTI-STREAMER LIVE STREAMING METHOD AND APPARATUS

CROSS-REFERENCE TO RELATED APPLICATION

The present application claims priority to Chinese Patent Application No. 202211537681.6, filed on Dec. 2, 2022, which is incorporated herein by reference in its entirety.

TECHNICAL FIELD

The present application relates to the field of computer technologies, and in particular, to a multi-streamer live streaming method. The present application also relates to a multi-streamer live streaming apparatus, a computing device, and a computer-readable storage medium.

BACKGROUND ART

With development of Internet technologies and application and development of intelligent devices, a live streaming platform has diversified live streaming content, for example, online entertainment or game live streaming. Game live streaming is used as an example. Current game live streaming is mainly participated in by a single streamer. Through explanation, a game playing picture, for example, a process in which a virtual character performs a game task, is pushed and displayed in a form of a live streaming stream in a live streaming room corresponding to the single streamer. Improvements in living streaming are desired.

SUMMARY OF THE INVENTION

In view of this, embodiments of the present application provide a multi-streamer live streaming method. The present application also relates to a multi-streamer live streaming apparatus, a computing device, and a computer-readable storage medium, to resolve a complex problem of multi-streamer co-streaming and interaction operations in the conventional technology.

According to a first aspect of the embodiments of the present application, there is provided a multi-streamer live streaming method, applied to a streamer client device, including:

- receiving virtual space information;
- determining target virtual character attribute information corresponding to a target streamer, and determining, based on the target virtual character attribute information, target live streaming view information corresponding to the streamer client device;
- obtaining reference virtual character attribute information corresponding to a reference streamer when it is determined that the virtual space information includes the reference streamer; and
- generating and displaying a multi-streamer live streaming image on the streamer client device by performing rendering based on the target live streaming view information, the target virtual character attribute information, the reference virtual character attribute information, and the virtual space information.

According to a second aspect of the embodiments of the present application, there is provided a multi-streamer live streaming method, including at least two streamer client devices and a server, where the server delivers virtual space information to the at least two streamer client devices; and

- the at least two streamer client devices receive the virtual space information sent by the server; determine target virtual character attribute information corresponding to each target streamer, and determine, based on the target virtual character attribute information, target live streaming view information corresponding to each streamer client device, where the target live streaming view information corresponding to each streamer client device is different; and generate and display a multi-streamer live streaming image corresponding to each streamer client device by performing rendering based on the target live streaming view information, the target virtual character attribute information, and the virtual space information.

According to a third aspect of the embodiments of the present application, there is provided a multi-streamer live streaming apparatus, applied to a streamer client device, including:

- a space information receiving module configured to receive virtual space information;
- a view information determining module configured to determine target virtual character attribute information corresponding to a target streamer, and determine, based on the target virtual character attribute information, target live streaming view information corresponding to the streamer client device;
- a reference streamer information obtaining module configured to obtain reference virtual character attribute information corresponding to a reference streamer when it is determined that the virtual space information includes the reference streamer; and
- a live streaming picture generation module configured to generate and display a multi-streamer live streaming image on the streamer client device by performing rendering based on the target live streaming view information, the target virtual character attribute information, the reference virtual character attribute information, and the virtual space information.

According to a fourth aspect of the embodiments of the present application, there is provided a computing device, including a memory, a processor, and computer instructions stored in the memory and executable on the processor, where the computer instructions, when executed by the processor, implement the steps of the multi-streamer live streaming method.

According to a fifth aspect of the embodiments of the present application, there is provided a computer-readable storage medium storing computer instructions, where the computer instructions, when executed by a processor, implement the steps of the multi-streamer live streaming method.

The multi-streamer live streaming method provided in the present application is applied to a streamer client device, and includes: receiving virtual space information; determining target virtual character attribute information corresponding to a target streamer, and determining, based on the target virtual character attribute information, target live streaming view information corresponding to the streamer client device; obtaining reference virtual character attribute information corresponding to a reference streamer when it is determined that the virtual space information includes the reference streamer; and generating and displaying a multi-streamer live streaming image on the streamer client device by performing rendering based on the target live streaming view information, the target virtual character attribute information, the reference virtual character attribute information, and the virtual space information.

In one embodiment of the present application, the streamer client device receives the virtual space information, and determines the target live streaming view information of the current streamer client device; when it is determined that the virtual space information includes another reference streamer, may obtain corresponding reference virtual character attribute information of the reference streamer; and further generates the multi-streamer live streaming image of live streaming on the streamer client device by performing rendering on the streamer client device based on the target live streaming view information, the target virtual character attribute information, the reference virtual character attribute information, and the virtual space information. In this way, a method for live streaming of a virtual streamer in a multi-person virtual scene is supported. To be specific, in the virtual space for live streaming on the streamer client device, the target streamer and the reference streamer interact in the same virtual space, so that a plurality of streamers can interact with each other without a need to set up a live chat connection repeatedly. In addition, corresponding target live streaming view information is selected for each streamer client device, so that each live streaming room displays a different multi-streamer live streaming image, thereby increasing diversity of live streaming pictures, improving attraction for an audience to enter a live streaming room of the streamer, and improving a live streaming effect of the streamer.

DETAILED DESCRIPTION OF EMBODIMENTS

Figure 1:
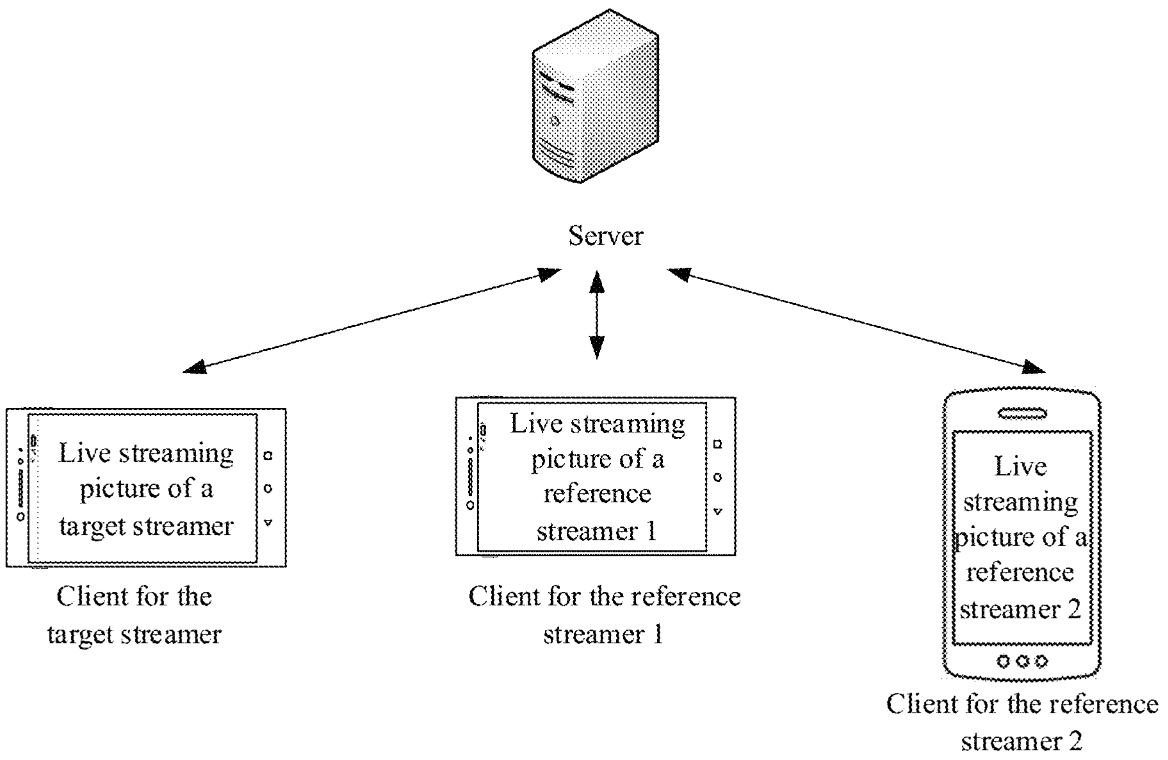
FIG. 1 is a schematic diagram of an application scenario of a multi-streamer live streaming method according to an embodiment of the present application.

In the following description, numerous specific details are set forth to provide a thorough understanding of the present application. However, the present application can be implemented in numerous other ways different from those described herein, and those skilled in the art can make similar extensions without departing from the essence of the present application. Therefore, the present application is not limited by the specific implementations disclosed below.

Terms used in one or more embodiments of the present application are merely for the purpose of describing specific embodiments, and are not intended to limit one or more embodiments of the present application. The terms "a/an", "said", and "the" in the singular form used in one or more embodiments of the present application and the appended claims are also intended to include the plural form, unless otherwise clearly indicated in the context. It should also be understood that the term "and/or" used in one or more embodiments of the present application refers to and includes any or all possible combinations of one or more of the associated listed items.

It should be understood that although the terms "first", "second", etc. may be used in one or more embodiments of the present application to describe various information, the information should not be limited to these terms. These terms are merely used to distinguish the same type of information from one another. For example, without departing from the scope of one or more embodiments of the present application, "first" may also be referred to as "second", and similarly, "second" may also be referred to as "first". Depending on the context, the word "if" as used herein may be interpreted as "when" or "upon" or "in response to determining".

First, the terms used in one or more embodiments of the present application are explained.

Virtual streamer: is who does an activity on a video website and a social platform by using an original virtual personality setting and image.

2D: also referred to as a planar graphic. Content of a 2D graphic only exists on a horizontal X-axis and a vertical Y-axis. A conventional manual cartoon and illustration fall into a 2D category.

3D: generally refers to spatial dimensions, generally including length, width, and height. For example, a 3D animation is not limited by time, space, a place, a condition, and an object. Complex and abstract program content, scientific principles, abstract concepts, and the like are represented in a centralized, simplified, graphic, and vivid manner in various representation forms.

In a current virtual live streaming application, there is usually a separate room (scene) for a streamer, and there is no scene applicable to multi-streamer live streaming. In a common multi-streamer virtual scene, a dedicated live chat connection needs to be set up, and pictures displayed in a plurality of live streaming rooms are the same. In a single-streamer live streaming scene, there is a bottleneck in content output of a streamer, and a procedure for setting up a live chat connection between a plurality of persons is complicated. For example, the procedure needs to be repeated when there is a need to have a live chat with another streamer. In addition, live chat pictures displayed in different streamer rooms are the same. Consequently, experience is poor.

In view of this, in the embodiments of the present application, a virtual scene for multi-person live streaming is created, so that different streamers can chat and interact with each other without a need to set up a live chat connection, which is required conventionally, thereby improving content generation efficiency of a streamer. In addition, views for live streaming rooms of different streamers change with views of the streamers, to improve user experience.

In addition, in a method, different live streaming requirements (image management/shot management/motion capture input management/sound management) of 3D/live2d virtual characters and capabilities of interaction in a same open virtual space are integrated by using software and a user interface design. According to such a manner in which a plurality of hardware device capabilities/multi-client device online capabilities are integrated into one application, a threshold for creating a conventional virtual live streaming environment is lowered for the first time, and a capability of a user in a live streaming room to obtain streamer-fan interaction and streamer-streamer interaction is also increased.

The present application provides a multi-streamer live streaming method. The present application also relates to a multi-streamer live streaming apparatus, a computing device, and a computer-readable storage medium. Details are described in the following embodiments one by one.

FIG. 1 is a schematic diagram of an application scenario of a multi-streamer live streaming method according to an embodiment of the present application.

The application scenario in FIG. 1 includes a server computing device (i.e., a server), a first streamer client computing device (i.e., client or client device) associated with a target streamer 1, a second client computing device associated with a reference streamer 1, and another client computing device associated with another reference streamer 2. Streamers associated with client computing devices have equal status, and there is no distinction between a target streamer and a reference streamer. Each streamer may be referred to as a target streamer, and the remaining other streamers may be understood as reference streamers. In this embodiment, the target streamer, the reference streamer 1, and the reference streamer 2 are used as examples to describe a live streaming solution in which interaction is performed in a virtual space.

In actual application, each streamer may enter a virtual space corresponding to multi-streamer live streaming. The virtual space may be understood as an online virtual space configured by the server. To implement quick live streaming, a plurality of streamers interact with each other in the virtual space, to enrich a live streaming display effect.

In specific implementation, the target streamer client device may receive virtual space information delivered by the server. The virtual space information is used to generate information about a virtual space for multi-streamer live streaming, at least one streamer may be displayed in the virtual space, and streamers may further interact with each other in the virtual space. Further, the target streamer selects a virtual image on the target streamer client device for live streaming, the target streamer client device displays preset live streaming view configuration information to the target streamer based on different virtual image types selected by the target streamer, and the target streamer may select corresponding target live streaming view information from the preset live streaming view configuration information. The live streaming view information may be understood as shot setting information for live streaming, for example, a shot function mode (a tracking mode, a fixed mode, an accompanying mode), and lens focal length information (a close-up, an upper body, a whole body). This is not specifically limited in this embodiment.

Still further, when it is determined that the virtual space information includes the reference streamer 1 and the reference streamer 2, the target streamer client device (i.e., the first streamer client device) obtains, from the server, reference virtual character attribute information corresponding to each of the reference streamer 1 and the reference streamer 2. It should be noted that the reference virtual character attribute information is attribute information uploaded by a client device for each reference streamer to the server in real time, and the attribute information may include a virtual image corresponding to the reference streamer, and the like. This is not specifically limited in this embodiment. After obtaining target virtual character attribute information, the reference virtual character attribute information, and the virtual space information, the target streamer client device may render a live streaming picture of each streamer in the virtual space based on the determined target live streaming view information, and display the live streaming picture on the target streamer client device.

It should be noted that, when an audience for the target streamer client device enters the virtual space by sending a bullet-screen comment, sending a comment, or the like, the audience may see a virtual character of another reference streamer by following a shot view of the target streamer. In addition, for multi-streamer live streaming images displayed on other client devices corresponding to the reference streamer 1 and the reference streamer 2, reference may be made to the description of the process in the above embodiment. In addition, views of multi-streamer live streaming images displayed on all streamer client devices are different, to increase display richness of a live streaming room of each streamer and attract an audience who watches live streaming.

In conclusion, in the multi-streamer live streaming method provided in this embodiment of the present application, a streamer can perform real-time co-streaming and interaction with another streamer only by moving closer to a virtual character of the another streamer in the same virtual space, without a need to set up a dedicated live chat connection. An audience in a live streaming room may see a virtual character of another streamer by following a shot view of the streamer, and an audience in a live streaming room of the another streamer may also see an image of the streamer from a view of the another streamer. This can not only support a method for live streaming of a virtual streamer in a multi-person virtual scene, but also enrich live streaming scenes.

Figure 2:
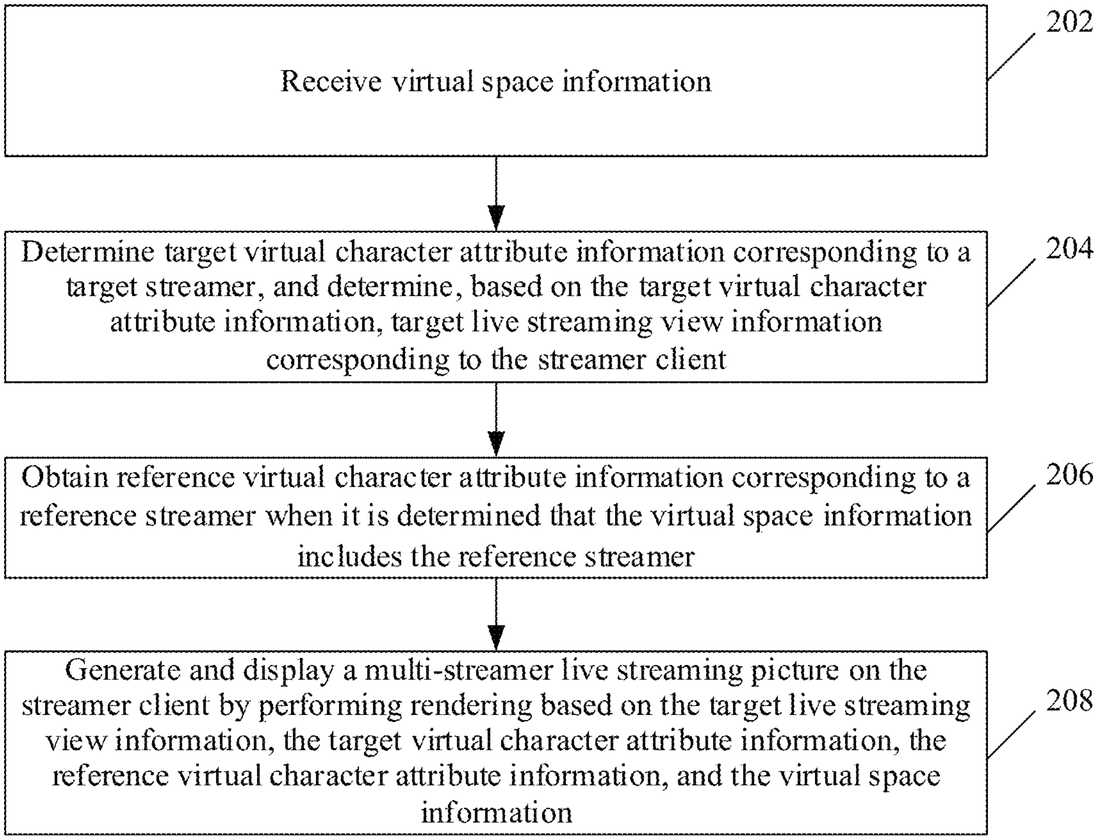
FIG. 2 is a flowchart of a multi-streamer live streaming method according to an embodiment of the present application.

FIG. 2 is a flowchart of a multi-streamer live streaming method according to an embodiment of the present application. The method specifically includes the following steps.

It should be noted that the multi-streamer live streaming method provided in this embodiment of the present application is applied to a streamer client device, and for each streamer client device, reference may be made to the implementation of the following embodiments, to not only implement live streaming of a plurality of streamers in a multi-person virtual space, but also provide a mechanism, an interaction behavior, and the like of displaying virtual images, of the streamers, of different display types (2D/3D) in the virtual space.

In step 202, virtual space information is received.

The virtual space information may be understood as information about an online virtual space configured by a server, including but not limited to scene information and object information about the virtual space. In other words, it is understood that a corresponding virtual space may be generated based on the virtual space information, and different types of virtual spaces such as a virtual large activity square may be generated according to different preset service requirements.

In actual application, a target streamer may trigger a live streaming instruction based on a quick live streaming entry of multi-streamer live streaming displayed on the client device, to implement one-click live streaming. Correspondingly, the streamer client device receives the virtual space information delivered by the server, and the virtual space generated based on the virtual space information is determined based on different live streaming types selected by the target streamer. For example, if the streamer selects a virtual space of a multi-person dance type, the virtual space information is generating a virtual space including a large dancing floor/square, and various corresponding scenes may also be set. This is not specifically limited in this embodiment.

In step 204, target virtual character attribute information corresponding to the target streamer is determined, and target live streaming view information corresponding to the first streamer client device is determined based on the target virtual character attribute information. The target streamer is associated with the first streamer client device.

The target virtual character attribute information may be understood as attribute information about a virtual character selected by the target streamer on the first streamer client device, and includes but is not limited to image information of a virtual character, and an appearance manner and location information of the virtual character.

In specific implementation, the target live streaming view information is information about a view for live streaming display on the first streamer client device, and the view information includes view orientation information, view focal length information, and view change and adjustment information. It should be noted that the information about the view for live streaming display on a streamer client device includes but is not limited to the view orientation information, the view focal length information, and the view change and adjustment information. This is not specifically limited in this embodiment.

In actual application, the first streamer client device may receive character attribute information corresponding to a virtual character selected by the target streamer, and may determine, based on the character attribute information, live streaming view information corresponding to a current live streaming client device. It should be noted that, in this embodiment, to resolve a height adaptation problem of the virtual character in the virtual space, parameter adjustments such as a location offset and a lens offset for loading the virtual character may be provided, to resolve a height adaptation problem of different characters in a virtual scene.

Further, in this embodiment, different live streaming view information may be configured for different types of virtual characters, so that the different types of virtual characters can be displayed in the virtual space. Specifically, the determining, based on the target virtual character attribute information, target live streaming view information corresponding to the streamer client device includes:

determining a target virtual character display type of the target streamer based on the target virtual character attribute information; and determining, from preset view configuration information based on the target virtual character display type, the target live streaming view information corresponding to the streamer client device.

The target virtual character display type may be understood as a display type of the virtual character selected by the target streamer on the first streamer client device, for example, a 2D virtual character type or a 3D virtual character type. In addition, a character role, a character dressing style, and the like of a virtual character corresponding to each display type are not limited.

The preset view configuration information may be understood as pre-configured lens configuration information corresponding to display types of different characters, and includes camera mode selection information, lens focal length information, lens variable range information, lens driver information, and the like.

In actual application, the target streamer may select, on the streamer client device, a virtual image that the target streamer wants to display in the virtual space, and the streamer client device determines a display type corresponding to the virtual image, for example, a 2D type or a 3D type. Further, the streamer client device may select, from the preset view configuration information based on the target virtual character display type, view information corresponding to live streaming. It should be noted that, the target streamer may select the target virtual character display type in a customized manner. For example, if an image maintained by the target streamer among fans is a 3D image, when the target streamer performs live streaming, a virtual character of the 3D image is correspondingly selected. This is not specifically limited.

Still further, the streamer client device calls different live streaming view information for display types of different virtual characters, to further better display a virtual image of each streamer. Specifically, the determining, based on the target virtual character display type, the target live streaming view information corresponding to the streamer client device includes:

calling, from the preset view configuration information, planar live streaming view information corresponding to the streamer client device when it is determined that the target virtual character display type is a planar display type; and calling, from the preset view configuration information, stereoscopic live streaming view information corresponding to the streamer client device when it is determined that the target virtual character display type is a stereoscopic display type.

The planar live streaming view information may be understood as shot view information for live streaming of a planar virtual character on the streamer client device, and includes but is not limited to front view information of the planar virtual character tracked by a lens, front close-up shot view information of a virtual character, front upper-body shot view information of the virtual character.

The stereoscopic live streaming view information may be understood as shot view information based on which live streaming of a stereoscopic virtual character is performed on the streamer client device, and includes but is not limited to fixed shot view information, close-up shot view information, high-angle shot view information, and free shot view information.

In actual application, the streamer client device determines, based on the display type of the virtual character selected by the target streamer, view information for live streaming on a current streamer client device, may call corresponding planar live streaming view information from the preset view configuration information (a 2D character lens system) when it is determined that the display type of the virtual character is the planar display type (that is, the virtual character is understood as a 2D virtual character), and may call corresponding stereoscopic live streaming view information from the preset view configuration information (a 3D character lens system) when it is determined that the display type of the virtual character is the stereoscopic display type (that is, the virtual character is understood as a 3D virtual character).

It should be noted that, specific live streaming view information selected by the streamer client device is not only related to a virtual character type selected by the target streamer but also related to view information that is preset by the target streamer, and the like. In addition, because the lens system provides a plurality of optional live streaming views, the target streamer may switch, through selection by tapping or by using a shortcut, between views in real time before live streaming or during live streaming, to provide an audience with different live streaming experience. This is not specifically limited in this embodiment.

In step 206, reference virtual character attribute information indicating attributes of a reference virtual character corresponding to a reference streamer is obtained when it is determined that the virtual space information includes the reference streamer. The reference streamer is associated with a second streamer client device. In some examples, the second streamer client device corresponds to live streaming view information that is the same as the target live streaming view information. In other examples, the second streamer client device corresponds to live streaming view information that is different from the target live streaming view information.

The reference virtual character attribute information may be understood as attribute information corresponding to a virtual character selected by the reference streamer, and includes but is not limited to image information of the virtual character, an appearance manner, location information, and the like of the virtual character.

In actual application, after receiving the virtual space information delivered by the server, the streamer client device may further detect whether there is information about another streamer in the virtual space. Because the virtual space provides an open entry and each streamer may enter the virtual space, the virtual space information delivered by the server to the current streamer client device may include the information about the another streamer. The another streamer is added to the virtual space as a reference streamer. In this embodiment, the number of reference streamers is not limited. Further, when it is determined that the virtual space information includes the reference streamer, the streamer client device may further obtain reference virtual character attribute information of the another reference streamer, to subsequently render, on the streamer client device, a picture in which the reference streamer interacts with the target streamer.

In addition, after the determining target virtual character attribute information corresponding to the target streamer and target live streaming view information corresponding to the streamer client device, the method further includes:

generating and displaying a target streamer live streaming picture on the streamer client device by rendering the target virtual character attribute information and the virtual space information based on the target live streaming view information when it is determined that the virtual space information does not include the reference streamer.

In step 208, generating and displaying a multi-streamer live streaming image on the first streamer client device by performing rendering based on the target live streaming view information, the target virtual character attribute information, the reference virtual character attribute information, and the virtual space information.

The multi-streamer live streaming image may be understood as a live streaming display picture of virtual characters corresponding to a plurality of streamers on the streamer client device, and the number of virtual characters in the live streaming picture is not limited herein.

In actual application, after determining live streaming view information of current live streaming, the streamer client device may perform rendering of the virtual character and the virtual space, render the virtual space delivered by the server, and then render an image corresponding to the virtual character selected by the target streamer and an image corresponding to the virtual character selected by the reference streamer. Further, the multi-streamer live streaming image to be displayed on the streamer client device is generated based on the target live streaming view information determined in the above embodiment. Subsequently, the multi-streamer live streaming image is pushed to the server, and the server sends the multi-streamer live streaming image to another streamer client device for display. In addition, an audience client device may pull a stream from the server, to display the multi-streamer live streaming image on the audience client device.

For example, if the target streamer selects a 3D virtual character, it may be determined that the target live streaming view information is stereoscopic live streaming view information. Therefore, it may be determined that the 3D virtual character of the target streamer is displayed at a fixed view, and a picture of the 3D virtual character from any view may be seen by following such a live streaming view. When a shot view is fixed, in a process in which the 3D virtual character is freely moved and displayed in the virtual space, the 3D virtual character may be displayed at any angle at the fixed shot view. Therefore, a character front, a character side, a character back, or the like of the 3D virtual character of the target streamer may be displayed in the live streaming picture. This is not limited.

Specifically, the generating and displaying a multi-streamer live streaming image on the streamer client device by performing rendering based on the target live streaming view information, the target virtual character attribute information, the reference virtual character attribute information, and the virtual space information includes:

determining, based on the virtual space information, a virtual space to be displayed on the streamer client device;

determining, based on the target virtual character attribute information, a target streamer virtual image corresponding to the target streamer;

determining, based on the reference virtual character attribute information, a reference streamer virtual image corresponding to the reference streamer; and mapping, based on the target live streaming view information, the target streamer virtual image and the reference streamer virtual image to the virtual space to be displayed, and generating the multi-streamer live streaming image on the streamer client device by performing rendering.

In actual application, the streamer client device performs rendering based on the virtual space information, the target virtual character attribute information, and the reference virtual character attribute information separately, to be specific, renders, based on the virtual space information, the virtual space to be displayed on the streamer client device, and then renders a corresponding streamer virtual image based on virtual character attribute information corresponding to a streamer. Finally, the target streamer virtual image and the reference streamer virtual image are separately mapped, based on the target live streaming view information determined by the streamer client device, to the virtual space to be displayed, to render and generate the multi-streamer live streaming image to be displayed on the streamer client device.

It should be noted that a process and a manner of rendering and generating the multi-streamer live streaming image are not limited in this embodiment. The above describes only one implementation, and the description of this embodiment focuses on this.

Further, during rendering of each virtual character on the streamer client device, a specific location at which the virtual character is to be located after the rendering in the virtual space further needs to be considered. Therefore, the streamer client device may determine the location based on the obtained target virtual character attribute information and reference virtual character attribute information. Specifically, the target virtual character attribute information includes target location information, and the reference virtual character attribute information includes reference location information.

Correspondingly, the mapping the target streamer virtual image and the reference streamer virtual image to the virtual space to be displayed includes: generating, by performing rendering, the virtual space to be displayed; and rendering, based on the target location information, the target streamer virtual image in the virtual space to be displayed, and rendering, based on the reference location information, the reference streamer virtual image in the virtual space to be displayed.

In actual application, the streamer client device may determine the target location information for displaying the target streamer in the virtual space to be displayed and determine the reference location information for displaying the reference streamer in the virtual space to be displayed. A location in the virtual space to be displayed is used as a reference for the target location information and the reference location information herein. In other words, the location information is location information that can be displayed in the virtual space to be displayed. Further, the streamer client device may render, based on the target location information, the target streamer virtual image in the virtual space to be displayed, and render, based on the reference location information, the reference streamer virtual image in the virtual space to be displayed.

According to the live streaming picture rendering manner provided in this embodiment of the present application, a picture that is of each streamer and that is displayed at a specific location in the virtual space may be obtained by rendering. In an entire live streaming process, each streamer may move freely in the virtual space. In addition, the streamer client device also performs a rendering task in real time, to display a state of each streamer in the virtual space in real time.

In addition, in addition to the target streamer who may select a 2D virtual character or a 3D virtual character and that is mentioned in the above embodiment, the reference streamer in this embodiment may also select a 2D virtual character or a 3D virtual character. Therefore, a reference streamer picture that corresponds to the reference streamer and that is rendered on the streamer client device is different. Specifically, the rendering, based on the reference location information, the reference streamer virtual image in the virtual space to be displayed includes:

- determining a reference virtual character display type of the reference streamer based on the reference virtual character attribute information;
- rendering, based on the reference location information, a planar streamer picture of the reference streamer virtual image in the virtual space to be displayed when it is determined that the reference virtual character display type is a planar display type; and
- rendering, based on the reference location information, a stereoscopic streamer picture of the reference streamer virtual image in the virtual space to be displayed when it is determined that the reference virtual character display type is a stereoscopic display type.

In actual application, the streamer client device may further determine, based on the obtained reference virtual character attribute information, the reference virtual character display type corresponding to the reference streamer. Similar to the virtual character display type of the target streamer, the reference virtual character display type may be classified into a planar display type and a stereoscopic display type. It indicates that the reference streamer may freely select a 2D virtual character or a 3D virtual character to enter the virtual space. Further, when rendering the reference streamer virtual image, the streamer client device renders the planar streamer picture or the stereoscopic streamer picture of the reference streamer based on different display types. Details are not described herein.

Based on this, after initial rendering is performed on the multi-streamer live streaming image on the streamer client device, virtual images of all streamers may interact in the virtual space. Because such a multi-streamer interaction manner is not a live chat process in a live streaming room, a streamer interaction operation becomes simple. In the virtual space, when the target streamer moves closer to another reference streamer, an interaction behavior, for example, a mutual greeting behavior, may be triggered. Further, the streamer client device may render a two-party or multi-party greeting behavior in real time, such that an audience in the streamer client device can see an entire interaction process, to attract more audiences to some extent.

Specifically, after the generating and displaying a multi-streamer live streaming image on the streamer client device by performing rendering based on the target live streaming view information, the target virtual character attribute information, the reference virtual character attribute information, and the virtual space information, the method further includes:

- determining a target interaction rule for the target streamer based on the target virtual character attribute information when it is determined that the target streamer and the reference streamer in the multi-streamer live streaming image meet a preset interaction condition, and determining a reference interaction rule for the reference streamer based on the reference virtual character attribute information;
- rendering a target interaction picture in which the target streamer interacts according to the target interaction rule, and rendering a reference interaction picture in which the reference streamer interacts according to the reference interaction rule; and
- generating and displaying the multi-streamer live streaming image on the streamer client device based on the target interaction picture and the reference interaction picture.

The preset interaction condition may be understood as a condition for interaction between virtual characters corresponding to all the streamers, for example, an interaction condition that a distance between all the streamers satisfies a preset threshold, or a condition that at least one of the streamers agrees to perform interaction. This is not specifically limited in this embodiment.

In actual application, when the streamer client device determines that the target streamer and the reference streamer in the multi-streamer live streaming image meet the preset interaction condition, the streamer client device may determine an interaction rule corresponding to each streamer. In other words, the target streamer has a target interaction rule corresponding to the target streamer, and the reference streamer has a reference interaction rule corresponding to the reference streamer. The interaction rule may be related to a display type of a virtual character corresponding to the streamer. For example, if the target virtual character selected by the target streamer is a 2D virtual character, the interaction rule corresponding to the target streamer may be different from an interaction rule corresponding to the 3D virtual character. For example, the 2D virtual character merely nods to greet, and the 3D virtual character can not only nod but also use a gesture to greet. The interaction rule of the 3D virtual character is richer than the interaction rule of the 2D virtual character. It should be noted that both the target streamer and the reference streamer determine respective interaction rules based on respective virtual character display types, and further, each streamer may complete an interaction process in the virtual space according to a respective interaction rule.

In specific implementation, the streamer client device may separately render, according to respective interaction rules, interaction pictures corresponding to virtual images of all the streamers, including the target interaction picture corresponding to the target streamer and the reference interaction picture corresponding to the reference streamer, generate the multi-streamer live streaming image based on the target interaction picture and the reference interaction picture, and display the multi-streamer live streaming image on the streamer client device.

It should be noted that, because the 2D virtual character does not have a three-dimensional form, the 2D virtual character is set to be displayed in a manner of always facing a shot view in both live streaming on a client device for the target streamer and live streaming on a client device for the reference streamer, to avoid a sense of disharmony of the 2D/3D character in the interaction process.

In addition, in this embodiment, when a clipping bug occurs in interaction between streamers in a same virtual space, a processing mechanism is provided, to improve an effect of displaying the target streamer virtual image on the streamer client device. Specifically, the multi-streamer live streaming method provided in this embodiment of the present application further includes:

- determining, based on target location information in the target virtual character attribute information, a target location corresponding to the target streamer, and determining, based on reference location information in the reference virtual character attribute information, a reference location corresponding to the reference streamer;
- setting a display state of the reference streamer to a target display state when it is determined that a distance between the reference location and the target location is less than a preset distance threshold, where the target display state includes a transparent display state and a gray display state; and
- generating the reference interaction picture of the reference streamer based on the target display state.

In actual application, the streamer client device may determine, based on location information in virtual character attribute information corresponding to each streamer, a location at which the streamer is displayed currently in the virtual space. When it is determined that the distance between the reference location and the target location is less than the preset distance threshold, it indicates that a distance between two virtual images is short, and this may affect rendering and display of virtual images. In this case, the streamer client device may set a display state corresponding to the reference streamer to a transparent display state or a gray display state. A display state may not be limited. Further, the streamer client device may display, based on the determined target display state, a state of a reference virtual image corresponding to the reference streamer, to generate the reference interaction picture corresponding to the reference streamer.

Figure 3:
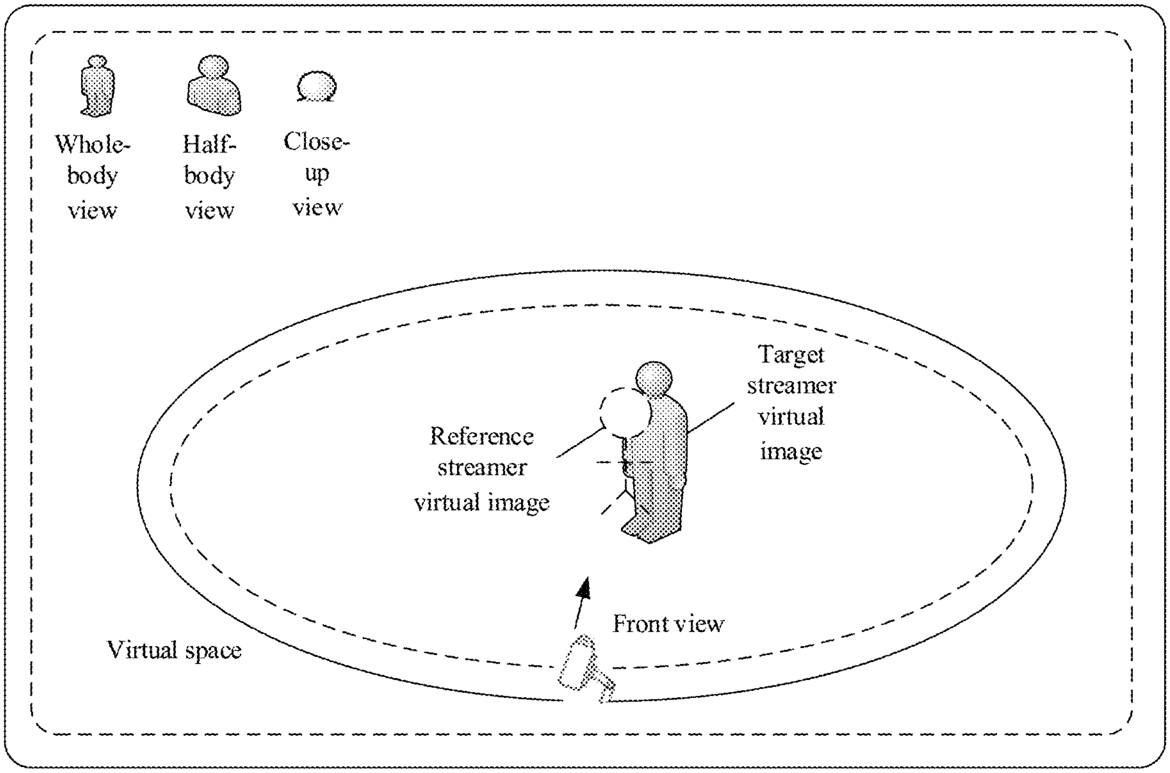
FIG. 3 is a schematic diagram of executing a transparent display mechanism for a reference streamer virtual image in a multi-streamer live streaming method according to an embodiment of the present application.

FIG. 3 is a schematic diagram of executing a transparent display mechanism for a reference streamer virtual image in a multi-streamer live streaming method according to an embodiment of the present application.

FIG. 3 is a schematic diagram of an interface displayed on a streamer client device. A middle part in the interface is shown as virtual space, and the virtual space includes one target streamer and one reference streamer. The target streamer is a 3D virtual character image, and the reference streamer is a 2D virtual character image. Because the 2D virtual character image cannot be displayed in a stereoscopic manner, the target live streaming view information determined by the streamer client device is planar live streaming view information. In other words, a capturing view of a camera is a front view of the 2D virtual character image. Further, when it is determined that a distance between the target streamer and the reference streamer is less than the preset distance threshold, it indicates that a clipping bug state may occur between the 2D virtual character image and the 3D virtual character image in the virtual space. Therefore, when rendering a reference streamer interaction picture, the streamer client device may set the 2D virtual character image of the reference streamer to a transparent state (as shown in FIG. 3, a dashed circle is used to indicate the transparent state of the reference streamer). In this way, the streamer client device may better display the 3D virtual character image corresponding to the target streamer. It should be noted that, in FIG. 3, setting the 2D virtual character image to the transparent state is merely an example. In actual application, when a clipping bug occurs, the streamer client device may render a virtual character image of another reference streamer in a transparent state regardless of whether the another reference streamer has a 2D virtual character image or a 3D virtual character image, to ensure that the target streamer can have a better rendering effect.

In addition, the target live streaming view information in FIG. 3 may be switched to another shot view selection mode at any time according to a selection instruction of the target streamer, for example, a whole-body shot view switching control, a half-body shot view switching control, or a close-up shot view switching control in the figure, which can all be used to render each streamer rendered in the current virtual space. This is not specifically limited in this embodiment.

It should be noted that, a virtual character corresponding to each streamer may further have character motion capture experience, to enrich a live streaming scene. In different states, motion capture data corresponding to the streamer may be collected, to drive a virtual character in the virtual space to be displayed based on the motion capture data. Specifically, this is not specifically limited in this embodiment.

Further, after determining the location information of each streamer in the virtual space, the target streamer client device may further obtain sound source information of the reference streamer, to implement better interaction between the target streamer and the reference streamer. Specifically, after the determining a reference location corresponding to the reference streamer, the method further includes:

- obtaining reference sound source information corresponding to the reference streamer when it is determined that the distance between the reference location and the target location is less than the preset distance threshold, where the reference sound source information is sound information to be played for the reference streamer in a virtual space to be displayed; and playing the reference sound source information.

In actual application, when determining that the distance between the reference location of the reference streamer and the target location of the target streamer is short, for example, is less than the preset distance threshold, the streamer client device may obtain the reference sound source information corresponding to the reference streamer. The reference sound source information may be understood as sound information to be played for the reference streamer in the virtual space to be displayed on a streamer client device corresponding to the reference streamer, and includes but is not limited to sound information such as sound information to be played for the virtual image of the reference streamer and background music to be played on the client device for the reference streamer. This is not specifically limited in this embodiment. Further, the streamer client device of the target streamer may play the obtained reference sound source information on the streamer client device, so that not only the target streamer can hear the reference sound source information, but also the audience in the streamer client device can hear the corresponding reference sound source information, to better display a state of interaction between a plurality of streamers.

In addition, after the multi-streamer live streaming image of the target streamer is pushed and displayed on the streamer client device, the target streamer may adjust a current live streaming parameter in real time, to control the multi-streamer live streaming image to be rendered into different multi-streamer live streaming images based on different live streaming parameter attributes, so as to enrich a display mechanism of the live streaming picture. Specifically, after the generating and displaying a multi-streamer live streaming image on the streamer client device, the method further includes:

determining parameter switching information of the multi-streamer live streaming image in response to a parameter switching instruction corresponding to the target streamer; and updating the multi-streamer live streaming image based on the parameter switching information.

The parameter switching instruction may be understood as a switching instruction of the target streamer for each live streaming parameter of the current multi-streamer live streaming image, and includes but is not limited to an instruction such as enabling a microphone, disabling a camera, switching a live streaming view, or changing a virtual character.

In actual application, the streamer client device may determine, according to the received parameter switching instruction, the parameter switching information corresponding to the multi-streamer live streaming image, for example, virtual character information about changing the virtual character, and information about switching to a close-up view. Further, the streamer client device may update the multi-streamer live streaming image in real time based on the parameter switching information. In addition, the updated live streaming picture may be further uploaded to the server, so that the server synchronizes the updated live streaming picture to another streamer client device or audience client device. This is not specifically limited.

In another embodiment of the present application, the audience may also enter the virtual space by using a virtual image, to implement that the virtual character of the audience interacts with virtual characters of a plurality of streamers. Specifically, after the generating and displaying a multi-streamer live streaming image on the streamer client device, the method further includes:

receiving virtual character attribute information of a target audience;

determining, based on the virtual character attribute information, an audience virtual image corresponding to the target audience and audience location information corresponding to the audience virtual image in a virtual space; and generating and displaying a multi-streamer interactive live streaming picture on the streamer client device by performing rendering based on the target live streaming view information, the audience virtual image, the audience location information, and the multi-streamer live streaming image.

In actual application, in live streaming on the streamer client device after the multi-streamer live streaming image is generated, the target audience may select, by using the audience client device, a virtual character image to enter the virtual space, a location at which the virtual character image is to be located, or the like, that is, the virtual character attribute information, and upload the virtual character attribute information to the server, and the server delivers the virtual character attribute information to the streamer client device. After receiving the virtual character attribute information of the target audience, the streamer client device may determine the audience virtual image of the target audience and audience location information of the audience virtual image in the virtual space. Further, on the streamer client device, the audience virtual image is rendered in the multi-streamer live streaming image based on the determined target live streaming view information, the audience virtual image, the audience location information, and the multi-streamer live streaming image on the current live streaming client device, and is displayed at a location corresponding to the audience location information in the virtual space, so that the multi-streamer interactive live streaming picture in which the streamer interacts with the audience is generated, displayed on the streamer client device, and uploaded to the server, thereby completing a picture synchronization between each streamer client device and the audience client device.

The audience may be displayed as the virtual image in the same virtual space with a plurality of streamers, to enrich the interaction process.

In conclusion, according to the multi-streamer live streaming method provided in this embodiment of the present application, a plurality of virtual streamers perform live streaming in a scene of the virtual space. In addition, during rendering of the multi-streamer live streaming image on the streamer client device, a display mechanism, an interaction mechanism, and the like of virtual images of all the virtual streamers also need to be considered, to ensure that each streamer rendered on the streamer client device can be better displayed, and provide the audience with better visual experience.

Figure 4:
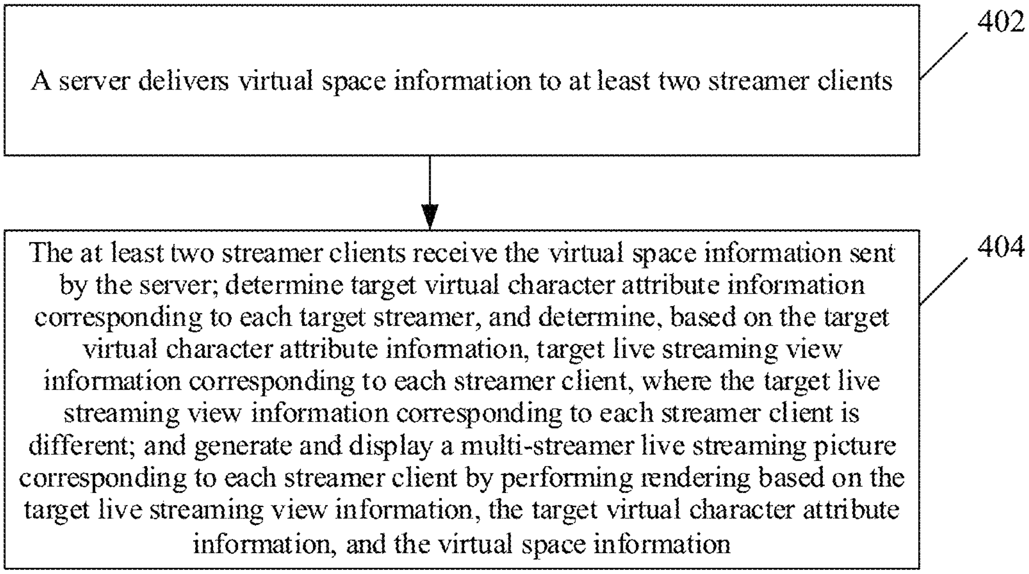
FIG. 4 is a flowchart of a multi-streamer live streaming method according to another embodiment of the present application.

With reference to FIG. 4, another embodiment of the present application provides a multi-streamer live streaming method, including at least two streamer client devices and a server. The method may specifically include the following steps.

In step 402, the server delivers virtual space information to the at least two streamer client devices.

In actual application, the server may deliver the virtual space information to each streamer client device. In other words, each streamer client device displays a same virtual space. For a meaning of the virtual space information, reference may be made to the descriptions in the above embodiment. Details are not repeated herein.

In step 404, the at least two streamer client devices receive the virtual space information sent by the server; determine target virtual character attribute information corresponding to each target streamer, and determine, based on the target virtual character attribute information, target live streaming view information corresponding to each streamer client device, where the target live streaming view information corresponding to each streamer client device is different; and generate and display a multi-streamer live streaming image corresponding to each streamer client device by performing rendering based on the target live streaming view information, the target virtual character attribute information, and the virtual space information.

In actual application, each streamer client device may receive same virtual space information sent by the server. Each streamer client device may further determine the target live streaming view information based on the target virtual character attribute information corresponding to each target streamer. It should be noted that the target live streaming view information corresponding to each streamer client device is different. Because a location of a virtual character of each target streamer in the virtual space is different, and an angle at which a camera captures the virtual character is different, a live streaming view is also different. In addition, a different virtual character selected by each streamer client device also affects corresponding live streaming view information. For example, live streaming view information of a 2D virtual character is different from that of a 3D virtual character. For details, reference may be made to descriptions in the above embodiment. This is not specifically limited herein.

Further, although the multi-streamer live streaming image displayed on each streamer client device includes the same virtual space, live streaming pictures displayed on all the streamer client devices are different from each other due to different live streaming views. It may be understood as display of different views in the same virtual space, to enrich a display effect of the live streaming picture. An audience may select live streaming views on different streamer client devices based on a preference, to watch an interaction process in the virtual space. In this way, more attention of the audience can be attracted.

Figure 5:
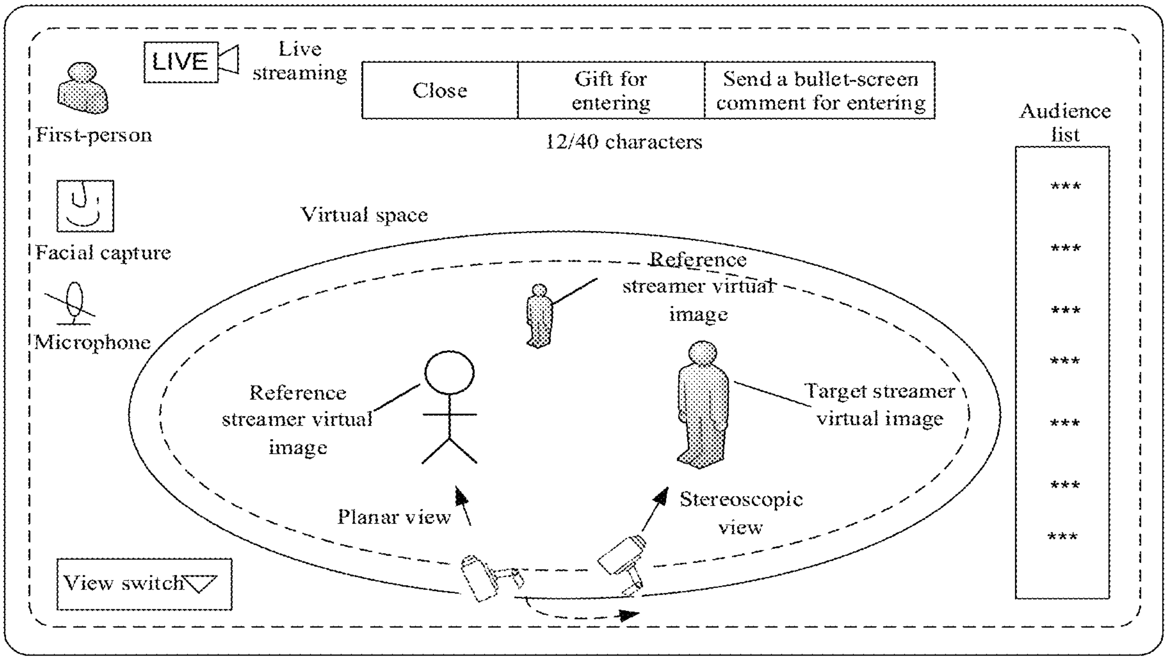
FIG. 5 is a schematic diagram of displaying a live streaming interface in a multi-streamer live streaming method applied to a game scene according to an embodiment of the present application.

The multi-streamer live streaming method is further described below with reference to FIG. 5 by using, as an example, the application of the multi-streamer live streaming method provided in the present application in a game scene. FIG. 5 is a schematic diagram of an interface of a multi-streamer live streaming method applied to a game scene according to an embodiment of the present application.

It should be noted that, FIG. 5 may be a schematic diagram of a multi-streamer live streaming scene in a game scene. The virtual space may be understood as a virtual space in the game scene. After entering the virtual space, each streamer performs a game task in the virtual space in the game scene, and the like.

FIG. 5 may be understood as a schematic diagram of displaying a live streaming process on a streamer client device. After the target streamer taps on a live streaming control on the streamer client device, the target streamer may enter a game to control, to play in the scene, a virtual image selected by the target streamer. The scene includes various interaction facilities, and may support multi-person interaction, single-person interaction, or the like.

Further, the target streamer may switch a camera view in a lower left corner of the schematic diagram, for example, switch between a first-person view, a close-up view, a free view, a back view, a top view, or the like for live streaming, where a switching manner may be switching performed by selecting a control by tapping, or may be switching performed by using a shortcut; and may select, on a left side, whether to enable a facial/motion capture function, a microphone function, and the like, where whether to enable the capture function may be freely selected for different virtual image types, to display a face, a motion, and the like of each streamer in the virtual space. The streamer client device may also automatically check available hardware. When the microphone is available, the streamer client device prompts, on an interface, whether to enable the microphone. An audience list on a right side may show each audience who watches the multi-streamer live streaming. The target streamer may select by tapping, on the streamer client device, controls for “Gift for entering”, “Send a bullet-screen comment for entering”, and “Close”. After entering the virtual space, the audience may still establish an interaction relationship with a virtual streamer. In addition, a sound source for playing a sound in a virtual space scene may implement functions such as sound source coverage and a sound transition (when a sound enters another sound source coverage area from one sound source coverage area, the sound is not immediately switched; instead, the sound is gradually decreased in the sound source coverage area, and is gradually increased in the another sound source coverage area), so that a sound effect has a clear sense of orientation based on a location of a sound source. If some areas are not covered by a sound source, a background sound may be further enabled to supplement a sound source in the area, so as to improve comprehensiveness of sound source coverage in the virtual space scene, and improve user experience.

Still further, the virtual space may include a plurality of streamer virtual images. According to the number shown in the figure, there are 12 streamer virtual images in a current virtual space and a maximum of 40 streamer virtual images may be accommodated in the virtual space (only three virtual images are displayed as an example in FIG. 5). Each virtual image may be a 2D virtual image or a 3D virtual image, and this does not impede interaction between the virtual images. Each streamer can perform real-time co-streaming and interaction with another streamer/audience only by moving closer to the character of the another streamer/audience in the same virtual space, without a need to set up a dedicated live chat connection. An audience in a live streaming room may see a virtual character of another streamer/audience by following a shot view of the streamer, and an audience in a live streaming room of the another streamer may also see an image of the streamer by following a view of the another streamer.

Further, it is ensured that different interaction manners are configured for different characters between the 2D virtual image and the 3D virtual image, and interaction experience of different characters is ensured. For example, specific and diversified interaction operations such as a hug and a handshake may be configured for 3D characters. A specific simple interaction, for example, nodding to each other, or interacting with each other by interacting with an object in the scene, for example, simultaneously sitting on a chair, may be performed between a 2D character and a 3D character, or between a 2D character and a 2D character.

In conclusion, in a game live streaming scene, a virtual space for multi-streamer live streaming is provided, so that all streamers can implement a real-time interaction mechanism in a virtual scene without a need to set up a live chat connection with a live streaming room, and an interaction mechanism between a 2D character and a 3D character is also implemented, thereby greatly improving a live streaming effect and attract a large quantity of audiences to watch live streaming.

Figure 6:
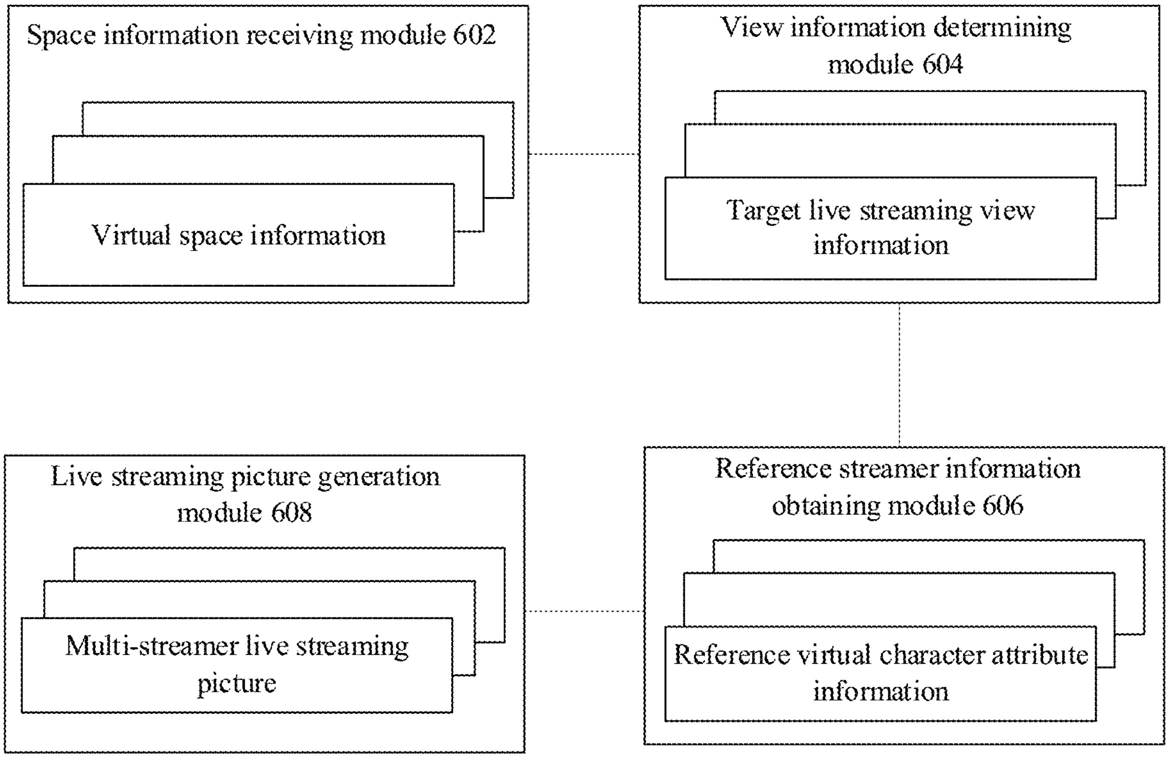
FIG. 6 is a schematic diagram of a structure of a multi-streamer live streaming apparatus according to an embodiment of the present application.

Corresponding to the above method embodiments, the present application further provides an embodiment of a multi-streamer live streaming apparatus. FIG. 6 is a schematic diagram of a structure of a multi-streamer live streaming apparatus according to an embodiment of the present application. As shown in FIG. 6, the apparatus is applied to a streamer client device, and includes:

a space information receiving module 602 configured to receive virtual space information;

a view information determining module 604 configured to determine target virtual character attribute information corresponding to a target streamer, and determine, based on the target virtual character attribute information, target live streaming view information corresponding to the streamer client device;

a reference streamer information obtaining module 606 configured to obtain reference virtual character attribute information corresponding to a reference streamer when it is determined that the virtual space information includes the reference streamer; and a live streaming picture generation module 608 configured to generate and display a multi-streamer live streaming image on the streamer client device by performing rendering based on the target live streaming view information, the target virtual character attribute information, the reference virtual character attribute information, and the virtual space information.

Optionally, the view information determining module 604 is further configured to:

determine a target virtual character display type of the target streamer based on the target virtual character attribute information; and determine, from preset view configuration information based on the target virtual character display type, the target live streaming view information corresponding to the streamer client device.

Optionally, the view information determining module 604 is further configured to:

call, from the preset view configuration information, planar live streaming view information corresponding to the streamer client device when it is determined that the target virtual character display type is a planar display type; and call, from the preset view configuration information, stereoscopic live streaming view information corresponding to the streamer client device when it is determined that the target virtual character display type is a stereoscopic display type.

Optionally, the live streaming picture generation module 608 is further configured to:

determine, based on the virtual space information, a virtual space to be displayed on the streamer client device;

determine, based on the target virtual character attribute information, a target streamer virtual image corresponding to the target streamer;

determine, based on the reference virtual character attribute information, a reference streamer virtual image corresponding to the reference streamer; and map, based on the target live streaming view information, the target streamer virtual image and the reference streamer virtual image to the virtual space to be displayed, and generate the multi-streamer live streaming image on the streamer client device by performing rendering.

Optionally, the target virtual character attribute information includes target location information, and the reference virtual character attribute information includes reference location information.

Optionally, the live streaming picture generation module 608 is further configured to:

generate, by performing rendering, the virtual space to be displayed; and render, based on the target location information, the target streamer virtual image in the virtual space to be displayed, and render, based on the reference location information, the reference streamer virtual image in the virtual space to be displayed.

Optionally, the live streaming picture generation module 608 is further configured to:

determine a reference virtual character display type of the reference streamer based on the reference virtual character attribute information;

render, based on the reference location information, a planar streamer picture of the reference streamer virtual image in the virtual space to be displayed when it is determined that the reference virtual character display type is a planar display type; and render, based on the reference location information, a stereoscopic streamer picture of the reference streamer virtual image in the virtual space to be displayed when it is determined that the reference virtual character display type is a stereoscopic display type.

Optionally, the apparatus further includes:

a streamer interaction picture generation module configured to determine a target interaction rule for the target streamer based on the target virtual character attribute information when it is determined that the target streamer and the reference streamer in the multi-streamer live streaming image meet a preset interaction condition, and determine a reference interaction rule for the reference streamer based on the reference virtual character attribute information;

render a target interaction picture in which the target streamer interacts according to the target interaction rule, and render a reference interaction picture in which the reference streamer interacts according to the reference interaction rule; and generate and display the multi-streamer live streaming image on the streamer client device based on the target interaction picture and the reference interaction picture.

Optionally, the apparatus further includes:

a reference interaction picture generation module configured to determine, based on target location information in the target virtual character attribute information, a target location corresponding to the target streamer, and determine, based on reference location information in the reference virtual character attribute information, a reference location corresponding to the reference streamer;

set a display state of the reference streamer to a target display state when it is determined that a distance between the reference location and the target location is less than a preset distance threshold, where the target display state includes a transparent display state and a gray display state; and generate the reference interaction picture of the reference streamer based on the target display state.

Optionally, the apparatus further includes:

a sound source playing module configured to obtain reference sound source information corresponding to the reference streamer when it is determined that the distance between the reference location and the target location is less than the preset distance threshold, where the reference sound source information is sound information to be played for the reference streamer in a virtual space to be displayed; and play the reference sound source information.

Optionally, the apparatus further includes:

a target streamer live streaming picture generation module configured to generate and display a target streamer live streaming picture on the streamer client device by rendering the target virtual character attribute information and the virtual space information based on the target live streaming view information when it is determined that the virtual space information does not include the reference streamer.

Optionally, the target live streaming view information is information about a view for live streaming display on the streamer client device, and the view information includes view orientation information, view focal length information, and view change and adjustment information.

Optionally, the apparatus further includes:

an interactive live streaming picture generation module configured to receive virtual character attribute information of a target audience;

determine, based on the virtual character attribute information, an audience virtual image corresponding to the target audience and audience location information corresponding to the audience virtual image in a virtual space; and generate and display a multi-streamer interactive live streaming picture on the streamer client device by performing rendering based on the target live streaming view information, the audience virtual image, the audience location information, and the multi-streamer live streaming image.

Optionally, the apparatus further includes:

a live streaming picture updating module configured to determine parameter switching information of the multi-streamer live streaming image in response to a parameter switching instruction corresponding to the target streamer; and update the multi-streamer live streaming image based on the parameter switching information.

According to the multi-streamer live streaming apparatus provided in this embodiment of the present application, the virtual space information is received, and the target live streaming view information of the current streamer client device is determined; when it is determined that the virtual space information includes another reference streamer, corresponding reference virtual character attribute information of the reference streamer may be obtained; and the multi-streamer live streaming image of live streaming is further generated on the streamer client device by performing rendering on the streamer client device based on the target live streaming view information, the target virtual character attribute information, the reference virtual character attribute information, and the virtual space information. In this way, a method for live streaming of a virtual streamer in a multi-person virtual scene is supported. To be specific, in the virtual space for live streaming on the streamer client device, the target streamer and the reference streamer interact in the same virtual space, so that a plurality of streamers can interact with each other without a need to set up a live chat connection repeatedly. In addition, corresponding target live streaming view information is selected for each streamer client device, so that each live streaming room displays a different multi-streamer live streaming image, thereby increasing diversity of live streaming pictures, improving attraction for an audience to enter a live streaming room of the streamer, and improving a live streaming effect of the streamer.

The above describes a schematic solution of a multi-streamer live streaming apparatus in this embodiment. It should be noted that, a technical solution of the multi-streamer live streaming apparatus and a technical solution of the multi-streamer live streaming method belong to a same concept. For details that are not further described in the technical solution of the multi-streamer live streaming apparatus, refer to descriptions of the technical solution of the multi-streamer live streaming method.

Figure 7:
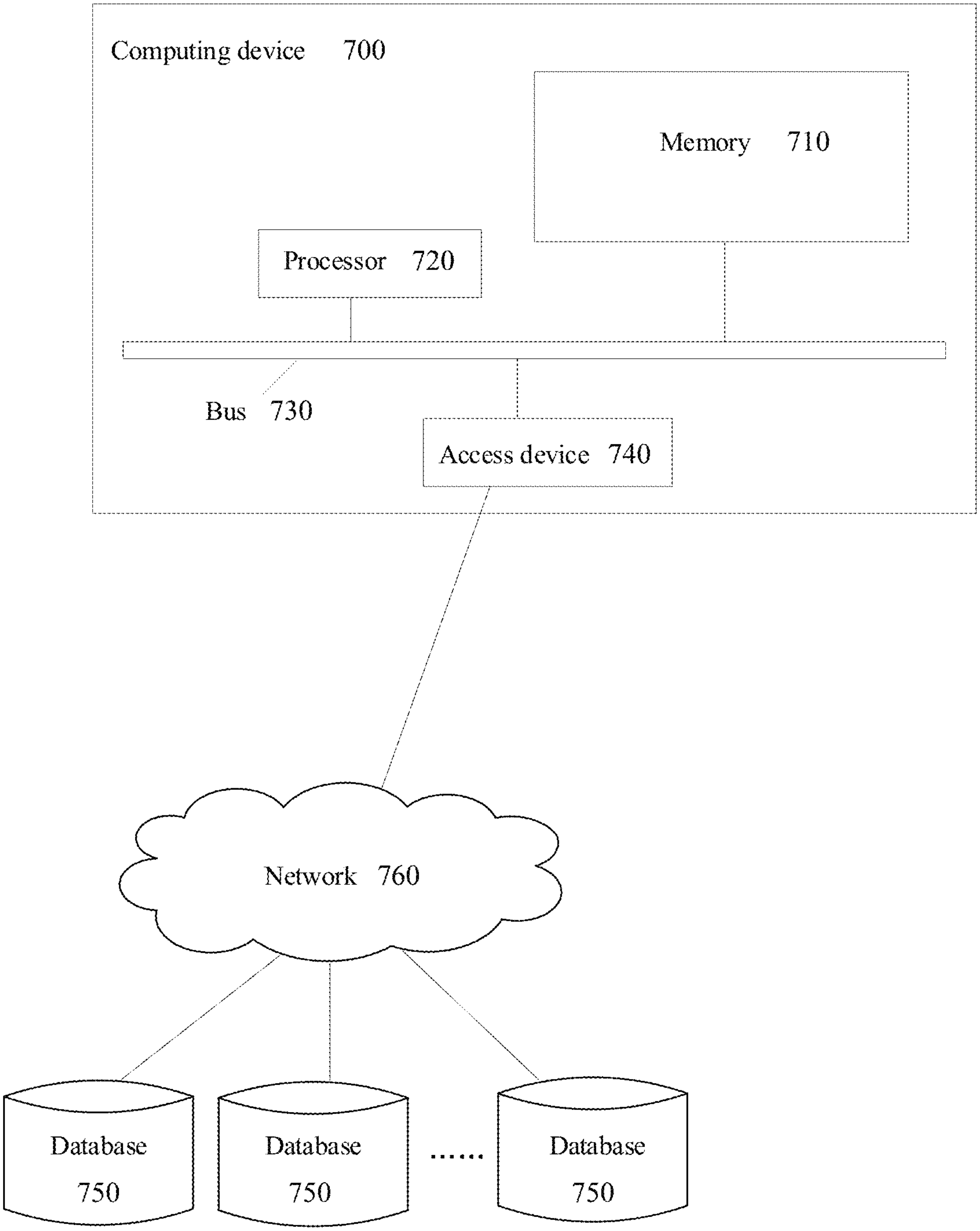
FIG. 7 is a block diagram of a structure of a computing device according to an embodiment of the present application.

FIG. 7 is a block diagram of a structure of a computing device 700 according to an embodiment of the present application. Components of the computing device 700 include but are not limited to a memory 710 and a processor 720. The processor 720 is connected to the memory 710 through a bus 730, and a database 750 is configured to store data.

The computing device 700 further includes an access device 740, and the access device 740 enables the computing device 700 to communicate via one or more networks 760. Examples of these networks include a public switched telephone network (PSTN), a local area network (LAN), a wide area network (WAN), a personal access network (PAN), or a combination of communications networks such as the Internet. The access device 740 may include one or more of any types of wired or wireless network interfaces (for example, a network interface controller (NIC)), for example, an IEEE 802.11 wireless local area network (WLAN) wireless interface, a worldwide interoperability for microwave access (Wi-MAX) interface, an Ethernet interface, a universal serial bus (USB) interface, a cellular network interface, a Bluetooth interface, and a near field communication (NFC) interface.

In an embodiment of the present application, the components of the computing device 700 and other components not shown in FIG. 7 may also be connected to each other, for example, through a bus. It should be understood that the block diagram of the structure of the computing device shown in FIG. 7 is merely an example, instead of limiting the scope of the present application. Those skilled in the art can add or replace other components as required.

The computing device 700 may be any type of stationary or mobile computing device, including a mobile computer or a mobile computing device (for example, a tablet computer, a personal digital assistant, a laptop computer, a notebook computer, or a netbook), a mobile phone (for example, a smartphone), a wearable computing device (for example, a smart watch or smart glasses), or other types of mobile devices, or a stationary computing device such as a desktop computer or a personal computer (PC). The computing device 700 may alternatively be a mobile or stationary server.

The computer instructions, when executed by the processor 720, implement the steps of the multi-streamer live streaming method.

The above describes a schematic solution of the computing device of this embodiment. It should be noted that the technical solution of the computing device and the technical solution of the multi-streamer live streaming method belong to a same concept. For details that are not further described in the technical solution of the computing device, reference may be made to the description of the technical solution of the multi-streamer live streaming method.

An embodiment of the present application further provides a computer-readable storage medium storing computer instructions, where the computer instructions, when executed by a processor, implement the steps of the multi-streamer live streaming method as described above.

The above describes a schematic solution of the computer-readable storage medium of this embodiment. It should be noted that the technical solution of the storage medium and the technical solution of the multi-streamer live streaming method belong to a same concept. For details that are not further described in the technical solution of the storage medium, reference may be made to the description of the technical solution of the multi-streamer live streaming method.

Specific embodiments of the present application are described above. Other embodiments are within the scope of the appended claims. In some cases, the actions or steps recited in the claims can be performed in an order different from that in the embodiments, and can still achieve desired results. In addition, the processes depicted in the figures are not necessarily required to be shown in a particular or sequential order, to achieve desired results. In some implementations, multi-task processing and parallel processing are also possible or may be advantageous.

The computer instructions include computer program code, which may be in a source code form, an object code form, an executable file form, some intermediate forms, etc. The computer-readable medium may include: any entity or apparatus that can carry the computer program code, such as a recording medium, a USB flash drive, a removable hard disk, a magnetic disk, an optical disc, a computer memory, a read-only memory (ROM), a random access memory (RAM), an electrical carrier signal, a telecommunications signal, and a software distribution medium. It should be noted that the content included in the computer-readable medium can be appropriately added or deleted depending on requirements of the legislation and patent practice in a jurisdiction. For example, in some jurisdictions, according to the legislation and patent practice, the computer-readable medium does not include an electrical carrier signal and a telecommunications signal.

It should be noted that, for ease of description, the above method embodiments are described as a series of action combinations. However, persons skilled in the art should understand that the present application is not limited to the described action order, because according to the present application, some steps may be performed in another order or simultaneously. Moreover, those skilled in the art should also understand that the embodiments described in this specification are all preferred embodiments, and the involved actions and modules are not necessarily required by the present application.

In the above embodiments, the embodiments are described with different emphases, and for a part which is not detailed in an embodiment, reference can be made to the related description of the other embodiments.

The preferred embodiments of the present application disclosed above are merely provided to help illustrate the present application. Optional embodiments are not intended to exhaust all details, nor do they limit the invention to only the described specific implementations. Apparently, many modifications and variations may be made in light of the content of the present application. In the present application, these embodiments are selected and specifically described to provide a better explanation of the principles and practical applications of the present application, so that those skilled in the art can well understand and utilize the present application. The present application should be defined only by the claims, and the full scope and equivalents thereof.

What is claimed is:

1. A method of implementing multi-streamer live streaming and multi-streamer interactions by a streamer client device, comprising:

receiving, by the streamer client device, virtual space information from a server computing device, wherein the streamer client device is associated with a target streamer, and the virtual space information comprises information indicative of a virtual space;

determining, by the streamer client device, target virtual character attribute information indicating attributes of a target virtual character corresponding to the target streamer;

determining, by the streamer client device, target live streaming view information based on the target virtual character attribute information;

detecting, by the streamer client device, whether the virtual space information comprises information indicative of a reference streamer, wherein the target streamer and the reference streamer have equal status without permission from one another;

acquiring, by the streamer client device, reference virtual character attribute information indicating attributes of a reference virtual character corresponding to the reference streamer in response to detecting that the virtual space information comprises the information indicative of the reference streamer;

generating, by the streamer client device, the virtual space based on the virtual space information;

mapping, by the streamer client device, the target virtual character and the reference virtual character into the generated virtual space based on the target live streaming view information, the target virtual character attribute information, and the reference virtual character attribute information;

generating and displaying, by the streamer client device, live streaming images to perform real-time co-streaming by the target streamer and the reference streamer with no need to set up a live chat connection, wherein each single image among the live streaming images comprises the target virtual character and the reference virtual character in the generated virtual space for multi-streamer live streaming;

displaying a plurality of shot view controls while displaying the live streaming images, wherein the plurality of shot view controls are configured to switch shot views of the target virtual character and the reference virtual character, and the plurality of shot view controls comprise a whole-body shot view control, a half-body shot view control, and a close-up shot view control;

detecting, by the streamer client device, whether a distance between the target virtual character representing the target streamer and the reference virtual character representing the reference streamer in the generated virtual space satisfies a predetermined threshold; and rendering, by the streamer client device, interaction behaviors of the target virtual character and the reference virtual character in the generated virtual space for the multi-streamer live streaming in response to detecting that the distance between the target virtual character and the reference virtual character satisfies the predetermined threshold.

2. The method according to claim 1, wherein the determining target live streaming view information based on the target virtual character attribute information further comprises:

determining a display type of the target virtual character corresponding to the target streamer based on the target virtual character attribute information; and determining the target live streaming view based on preset view configuration information and the display type of the target virtual character.

3. The method according to claim 1, wherein the determining target live streaming view information based on the target virtual character attribute information further comprises:

calling planar live streaming view information from preset view configuration information in response to determining that a display type of the target virtual character is a planar display type; and calling stereoscopic live streaming view information from preset view configuration information in response to determining that the display type of the target virtual character is a stereoscopic display type.

4. The method according to claim 1, wherein the target virtual character attribute information comprises target location information, wherein the reference virtual character attribute information comprises reference location information, and wherein the method further comprises:

rendering the target virtual character in the virtual space based on the target location information; and rendering the reference virtual character in the virtual space based on the reference location information.

5. The method according to claim 4, wherein the rendering the reference virtual character in the virtual space based on the reference location information further comprises:

determining a display type of the reference virtual character corresponding to the reference streamer based on the reference virtual character attribute information;

rendering a planar streamer picture of the reference virtual character in the virtual space based on the reference location information in response to determining that the display type of the reference virtual character is the planar display type; and rendering a stereoscopic streamer picture of the reference virtual character in the virtual space based on the reference location information in response to determining that the display type of the reference virtual character is the stereoscopic display type.

6. The method according to claim 1, further comprising:

determining a target interaction rule associated with the target streamer based on the target virtual character attribute information;

determining a reference interaction rule associated with the reference streamer based on the reference virtual character attribute information;

rendering a target interaction picture in which the target virtual character interacts according to the target interaction rule, and rendering a reference interaction picture in which the reference virtual character interacts according to the reference interaction rule; and generating and displaying the multi-streamer live streaming images based on the target interaction picture and the reference interaction picture.

7. The method according to claim 6, further comprising:

determining a target location of the target virtual character corresponding to the target streamer based on target location information in the target virtual character attribute information;

determining a reference location of the reference virtual character corresponding to the reference streamer based on reference location information in the reference virtual character attribute information;

setting display of the reference virtual character in a target display state in response to determining that a distance between the reference location and the target location is less than a preset distance threshold, wherein the target display state comprises a transparent display state and a gray display state; and generating the reference interaction picture of the reference virtual character based on the target display state.

8. The method according to claim 6, further comprising:

in response to determining that the distance between the target virtual character of the target streamer and the reference virtual character of the reference streamer is less than a preset distance threshold, acquiring reference sound source information corresponding to the reference streamer, wherein the reference sound source information comprises sound information to be played for the reference virtual character in the virtual space; and playing the reference sound source information while displaying the reference virtual character in the virtual space.

9. The method according to claim 1, wherein the target live streaming view information is associated with a view of live streaming display on the streamer client device, and wherein the live streaming view information comprises information indicative of a view orientation, information indicative of a view focal length, and information indicative of a view adjustment.

10. The method according to claim 1, further comprising:

receiving virtual character attribute information indicating attributes of an audience virtual character corresponding to a target audience;

determining the audience virtual character and audience location information of the audience virtual character in the virtual space based on the virtual character attribute information; and generating and displaying at least one interactive live streaming image on the streamer client device by performing rendering based on the target live streaming view information, the audience virtual character, the audience location information, and the multi-streamer live streaming image.

11. The method according to claim 1, further comprising:

determining parameter change information of the multi-streamer live streaming images in response to receiving an instruction of changing a parameter from the target streamer; and updating the multi-streamer live streaming images based on the parameter change information.

12. A client computing device, comprising a memory and a processor, wherein the memory stores computer-readable instructions that upon execution by the processor cause the processor to perform operations comprising:

receiving, by the client computing device, virtual space information from a server computing device, wherein the client computing device is associated with a target streamer, and the virtual space information comprises information indicative of a virtual space;

determining, by the client computing device, target virtual character attribute information indicating attributes of a target virtual character corresponding to the target streamer;

determining, by the client computing device, target live streaming view information based on the target virtual character attribute information;

detecting, by the client computing device, whether the virtual space information comprises information indicative of a reference streamer, wherein the target streamer and the reference streamer have equal status without permission from one another;

acquiring, by the client computing device, reference virtual character attribute information indicating attributes of a reference virtual character corresponding to the reference streamer in response to detecting that the virtual space information comprises the information indicative of the reference streamer;

generating, by the client computing device, the virtual space based on the virtual space information;

mapping, by the client computing device, the target virtual character and the reference virtual character into the generated virtual space based on the target live streaming view information, the target virtual character attribute information, and the reference virtual character attribute information;

generating and displaying, by the client computing device, live streaming images to perform real-time co-streaming by the target streamer and the reference streamer with no need to set up a live chat connection, wherein each single image among the live streaming images comprises the target virtual character and the reference virtual character in the generated virtual space for multi-streamer live streaming;

displaying a plurality of shot view controls while displaying the live streaming images, wherein the plurality of shot view controls are configured to switch shot views of the target virtual character and the reference virtual character, and the plurality of shot view controls comprise a whole-body shot view control, a half-body shot view control, and a close-up shot view control;

detecting, by the client computing device, whether a distance between the target virtual character and the reference virtual character in the generated virtual space satisfies a predetermined threshold; and rendering, by the client computing device, interaction behaviors of the target virtual character representing the target streamer and the reference virtual character representing the reference streamer in the generated virtual space for the multi-streamer live streaming in response to detecting that the distance between the target virtual character and the reference virtual character satisfies the predetermined threshold.

13. The client computing device according to claim 12, wherein the determining target live streaming view information based on the target virtual character attribute information further comprises:

determining a display type of the target virtual character corresponding to the target streamer based on the target virtual character attribute information; and determining the target live streaming view based on preset view configuration information and the display type of the target virtual character.

14. The client computing device according to claim 12, the operations further comprising:

determining a display type of the reference virtual character corresponding to the reference streamer based on the reference virtual character attribute information, wherein the reference virtual character attribute information further comprises reference location information indicative of a reference location of the reference virtual character in the virtual space;

rendering a planar streamer picture of the reference virtual character in the virtual space based on reference location information in response to determining that a display type of the reference virtual character is a planar display type; and rendering a stereoscopic streamer picture of the reference virtual character in the virtual space based on the reference location information in response to determining that the display type of the reference virtual character is a stereoscopic display type.

15. The client computing device according to claim 12, the operations further comprising:

determining a target interaction rule associated with the target streamer based on the target virtual character attribute information;

determining a reference interaction rule associated with the reference streamer based on the reference virtual character attribute information;

rendering a target interaction picture in which the target virtual character interacts according to the target interaction rule, and rendering a reference interaction picture in which the reference virtual character interacts according to the reference interaction rule; and generating and displaying the multi-streamer live streaming images based on the target interaction picture and the reference interaction picture.

16. The client computing device according to claim 12, the operations further comprising:

setting display of the reference virtual character in a target display state in response to determining that a distance between the reference virtual character and the target virtual character is less than a preset distance threshold, wherein the target display state comprises a transparent display state and a gray display state; and generating a reference interaction picture of the reference virtual character based on the target display state.

17. The client computing device according to claim 12, the operations further comprising:

in response to determining that the distance between the target virtual character and the reference virtual character is less than a preset distance threshold, acquiring reference sound source information corresponding to the reference streamer, wherein the reference sound source information comprises sound information to be played for the reference virtual character in the virtual space; and playing the reference sound source information while displaying the reference virtual character in the virtual space.

18. The client computing device according to claim 12, wherein the target live streaming view information is associated with a view of live streaming display on the client computing device, and wherein the live streaming view information comprises information indicative of a view orientation, information indicative of a view focal length, and information indicative of a view adjustment.

19. The client computing device according to claim 12, the operations further comprising:

receiving virtual character attribute information indicating attributes of an audience virtual character corresponding to a target audience;

determining the audience virtual character and audience location information of the audience virtual character in the virtual space based on the virtual character attribute information; and generating and displaying at least one interactive live streaming image on the client computing device by performing rendering based on the target live streaming view information, the audience virtual character, the audience location information, and the multi-streamer live streaming image.

20. A non-transitory computer-readable storage medium, storing computer-readable instructions that upon execution by a processor cause the processor to implement operations comprising:

receiving, by a streamer client device, virtual space information from a server computing device, wherein the streamer client device is associated with a target streamer, and the virtual space information comprises information indicative of a virtual space;

determining, by the streamer client device, target virtual character attribute information indicating attributes of a target virtual character corresponding to the target streamer;

determining, by the streamer client device, target live streaming view information based on the target virtual character attribute information;

detecting, by the streamer client device, whether the virtual space information comprises information indicative of a reference streamer, wherein the target streamer and the reference streamer have equal status without permission from one another;

acquiring, by the streamer client device, reference virtual character attribute information indicating attributes of a reference virtual character corresponding to the reference streamer in response to detecting that the virtual space information comprises the information indicative of the reference streamer;

generating, by the streamer client device, the virtual space based on the virtual space information;

mapping, by the streamer client device, the target virtual character and the reference virtual character into the generated virtual space based on the target live streaming view information, the target virtual character attribute information, and the reference virtual character attribute information;

generating and displaying, by the streamer client device, live streaming images to perform real-time co-streaming by the target streamer and the reference streamer with no need to set up a live chat connection, wherein each single image among the live streaming images comprises the target virtual character and the reference virtual character in the generated virtual space for multi-streamer live streaming;

displaying a plurality of shot view controls while displaying the live streaming images, wherein the plurality of shot view controls are configured to switch shot views of the target virtual character and the reference virtual character, and the plurality of shot view controls comprise a whole-body shot view control, a half-body shot view control, and a close-up shot view control;

detecting, by the streamer client device, whether a distance between the target virtual character representing the target streamer and the reference virtual character representing the reference streamer in the generated virtual space satisfies a predetermined threshold; and rendering, by the streamer client device, interaction behaviors of the target virtual character and the reference virtual character in the generated virtual space for the multi-streamer live streaming in response to detecting that the distance between the target virtual character and the reference virtual character satisfies the predetermined threshold.

* * * * *